United States Patent [19]
Smith et al.

[11] Patent Number: 5,350,496
[45] Date of Patent: Sep. 27, 1994

[54] SOLID STATE HIGH PRESSURE OXYGEN GENERATOR AND METHOD OF GENERATING OXYGEN

[75] Inventors: William F. Smith; James F. McElroy, both of Suffield, Conn.

[73] Assignee: United Technologies Corporation, Windsor Locks, Conn.

[21] Appl. No.: 929,324

[22] Filed: Aug. 13, 1992

[51] Int. Cl.$^5$ ............................ C25B 1/12; C25B 9/00
[52] U.S. Cl. .................................... 204/129; 204/263; 204/265; 204/266
[58] Field of Search ............... 204/129, 263, 266, 283, 204/292, 294, 265; C25B 1/04, 9/00

[56] References Cited

U.S. PATENT DOCUMENTS 4,457,824 7/1984 Dempsey et al. .................... 204/129

FOREIGN PATENT DOCUMENTS

| | | |
|---|---|---|
| 0493331 | 7/1992 | European Pat. Off. . |
| 2446868 | 8/1980 | France . |
| 51-018983 | 2/1976 | Japan . |
| 57-131376 | 8/1982 | Japan .............................. C25B 1/04 |
| 57-171674 | 10/1982 | Japan .............................. C25B 1/04 |

*Primary Examiner*—Kathryn Gorgos
*Attorney, Agent, or Firm*—Mary R. Bonzagni; Pamela J. Curbelo

[57] ABSTRACT

The production of high pressure oxygen comprises the use of an electrolysis cell having an anode, a cathode, an ion exchange membrane disposed therebetween, an anode chamber, a cathode chamber and a means for regulating pressure. The cathode chamber has a porous sheet which contacts the cathode and imparts structural integrity to the ion exchange membrane. Low or ambient pressure water enters the cathode chamber, wicks through the porous sheet, contacts the cathode, and osmotically transports across the ion exchange membrane from the cathode to the anode. At the anode, water electrolysis produces hydrogen ions and oxygen. The means for regulating pressure retains the oxygen within the anode chamber until the oxygen has attained the desire high pressure. Upon attaining the desired high pressure, the oxygen is removed from the anode chamber at a rate commensurate with the production of additional oxygen. As the oxygen pressure increases within the anode chamber and as the oxygen is removed from the anode chamber, the water continues to osmotically transport across the ion exchange membrane against the pressure gradient formed by the increasing oxygen pressure.

7 Claims, 1 Drawing Sheet

SOLID STATE HIGH PRESSURE OXYGEN GENERATOR AND METHOD OF GENERATING OXYGEN

TECHNICAL FIELD

The present invention relates to oxygen generation and especially to high pressure oxygen generation.

BACKGROUND OF THE INVENTION

In controlled environments, such as airplanes, submarines, or spacecraft, oxygen is necessary to maintain a habitable environment or provide emergency life support. This oxygen can be stored under high pressures ranging from about 1,000 pounds per square inch (psi) to about 6,000 psi. For example, in commercial airplanes, the oxygen is typically stored at pressures exceeding about 1,850 psi. As a result, oxygen must be either produced at a high pressure or compressed prior to storage. The production of this high pressure oxygen generally requires the use of extensive equipment such as compressors and pressure control devices.

One common high pressure oxygen preparation technique comprises introducing water to a pump which increases the pressure of the water to between 1,500 and 2,500 psi. The pressurized water is then introduced to an electrolysis cell comprising an anode, a cathode, an ion exchange membrane disposed therebetween, an anode chamber, and a cathode chamber. There are about 1.4 (theoretical) volts of electricity applied to the electrolysis cell such that the high pressure water is electrolyzed to high pressure hydrogen ions and oxygen at the anode. The high pressure hydrogen ions flow across the ion exchange membrane to the cathode due to the conductive path formed by the potential gradient across the ion exchange membrane. At the cathode, the hydrogen ions form high pressure molecular hydrogen, while the high pressure oxygen exits the electrolysis cell through the anode chamber.

Due to the state of electrolyzer art and the limited structural integrity of the ion exchange membrane, the pressure gradient across the ion exchange membrane should not exceed about 200 psi. Pressure gradients greater than about 200 psi induce ion exchange membrane failure by causing the extrusion of the membrane into the cathode chamber. As a result, the cathode chamber pressure must be maintained within about 200 psi of the water pressure entering the electrolysis cell. Maintenance of the pressure within the cathode chamber requires the employment of compressors and/or pressure control devices. Therefore, compressors and pressure control devices are needed to maintain the pressure of both the feed water and the cathode chamber. Furthermore, high pressure tolerant equipment is required for the entire electrolysis cell.

Another method of producing high pressure oxygen comprises introducing water to the anode chamber at ambient pressure. The water is electrolyzed at the anode to hydrogen ions and oxygen. The hydrogen ions flow across the ion exchange membrane to the cathode where they are formed into molecular hydrogen. The molecular hydrogen exits the electrolyzer through the cathode chamber. Meanwhile, the oxygen exits the anode chamber and is introduced to a compressor which pressurizes the oxygen to between 1,500 and 2,000 psi. Although this system eliminates the ion exchange membrane extrusion problem, it still requires additional equipment, including the compressor and pressure control devices.

What is needed in the art is a simplified system and method for producing high pressure oxygen capable utilizing ambient or low pressure water.

DISCLOSURE OF THE INVENTION

The present invention relates to a system and a method for producing high pressure oxygen. The high pressure oxygen system comprises an anode, a cathode, and an ion exchange membrane disposed therebetween, an anode chamber, and a cathode chamber. This cathode chamber has a porous sheet which contacts the cathode and imparts structural integrity to the ion exchange membrane. This system further comprises a means introducing water to the cathode chamber and a means for regulating pressure. This means for regulating pressure retains oxygen in the anode chamber until the oxygen reaches a desired pressure level.

The method of producing the high pressure oxygen comprises introducing water to the cathode chamber. In the cathode chamber, the water contacts the cathode and is osmotically transported across the ion exchange membrane from the cathode to the anode where it is electrolyzed to hydrogen ions and oxygen. This oxygen is retained within the anode chamber until it has reached the desired oxygen pressure.

The foregoing and other features and advantages the present invention will become more apparent from the following description and accompanying drawings.

BEST MODE FOR CARRYING OUT THE INVENTION

Figure 1:
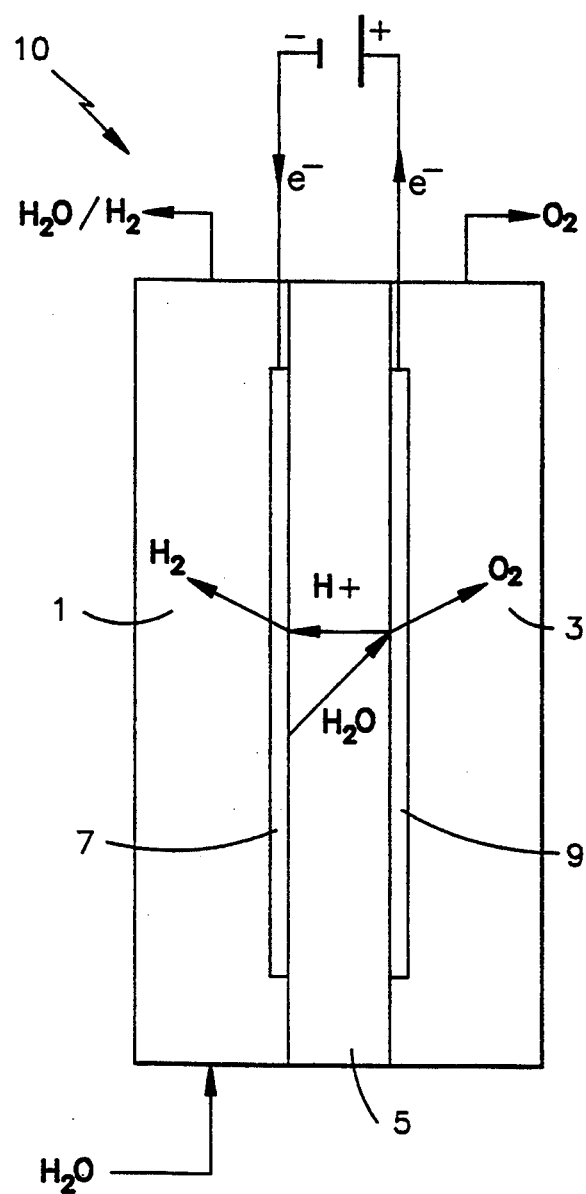
FIG. 1 is an embodiment of the system of the present invention which reveals the reaction mechanism.

The production of high pressure oxygen comprises introducing water to an electrolysis cell having an anode, a cathode, an ion exchange membrane disposed therebetween, an anode chamber, and a cathode chamber having a porous sheet, where the anode and cathode are connected via an external power supply. Referring to FIG. 1, which is meant to be exemplary, not limiting, water is introduced to the cathode chamber 1 where it contacts the cathode 7. The water is osmotically transported from the cathode 7 across the ion exchange membrane 5 to the anode 9. At the anode 9, water electrolysis converts the water to hydrogen ions and oxygen. The hydrogen ions flow back across the ion exchange membrane 5 to the cathode 7 where they exit the electrolyzer 10 as hydrogen gas through the cathode chamber 1. Meanwhile, the oxygen is retained within the anode chamber 3 until the oxygen pressure reaches the desired pressure level. Once at the desired pressure, the oxygen exits the electrolyzer 10 through the anode chamber 3 as high pressure oxygen.

Both the cathode chamber 1 and the anode chamber 3 can be maintained at any desirable pressure. Due to the expense of high pressure compatible components and the cost and amount of equipment associated with high pressure operation, ambient pressure anode and cathode chambers are preferred during start-up. During electrolysis, the pressure of the anode chamber 3 increases as the level of oxygen within the anode chamber 3 increases. As oxygen is produced at the anode 9, it is retained within the anode chamber 3 until the oxygen pressure has reached the desired pressure level. The pressure of the anode chamber 3 can increase from about ambient pressure up to about 6,000 psi.

In order to attain the desired oxygen pressure level within the anode chamber 3, a means for regulating pressure, such as a check valve, back pressure regulator, or other conventional pressure control device, maintains the anode chamber 3 as a closed system until the desired pressure has been attained. Once the desired oxygen pressure has been attained, oxygen is released from the anode chamber 3. Although all or any portion of the oxygen within the anode chamber 3 can be removed, it is preferred to remove the oxygen at a rate commensurate with the production of additional oxygen, thereby maintaining the desired oxygen pressure level within the anode chamber 3 and continuously producing the desired high pressure oxygen.

Figure 2:
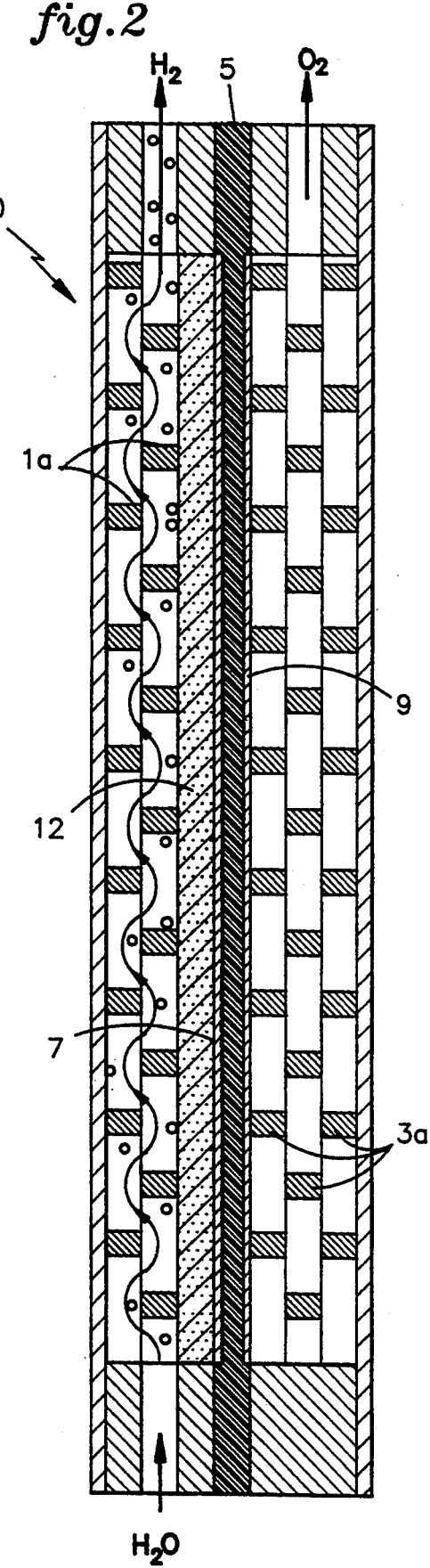
FIG. 2 is a detailed embodiment of the electrolyzer of FIG. 1.

Since the pressure of the anode chamber 3 increases during electrolysis, the pressure gradient across the ion exchange membrane 5 similarly increases. As a result, the ion exchange membrane 5 requires a means for improving structural integrity such as a porous sheet. Referring to FIG. 2, which is meant to be exemplary, not limiting, the porous sheet 12 establishes a simultaneous, dual-directional flow of hydrogen and water while providing the additional support necessary to tolerate pressure differentials up to about 6,000 psi. This porous sheet 12 has multiple pore sizes which typically range from about 5 microns to about 20 microns with about 10 microns to about 14 microns preferred, and a porosity of about 40% and about 60%. The larger pores allow hydrogen to move from cathode 7 to the cathode chamber 1 while the smaller pores simultaneously wick the water from the cathode chamber 1 through the smaller pores in the porous sheet 12 to the cathode 7.

The porous sheet 12 should be composed of a compound capable of being formed into a thin, porous sheet which allows dual directional flow and capable of supporting the ion exchange membrane under high pressure gradient conditions. This porous sheet 12 can be formed from a compound such as carbon, niobium, tantalum, titanium, zirconium, stainless steel mixtures thereof, and others. Since electrolysis cells typically operate in series, it is preferred that this porous sheet 12 is also electrically conductive. The electrical conductivity of the porous sheet 12 can be improved by electroplating it with a conductive metal. Typically a metal conventionally used to form the anode and the cathode can be utilized for electroplating purposes. A few of the possible electroplating metals include gold, iridium, palladium, platinum, rhodium, ruthenium, and mixtures thereof, among others, with platinum preferred. Generally, the porous sheet 12 is fine spotted using conventional electroplating techniques with about 0.05 milligrams per square centimeter ($mg/cm^2$) to about 0.2 $mg/cm^2$ of the electroplating metal, with about 0.07 $mg/cm^2$ to about 0.12 $mg/cm^2$ preferred.

The porous sheet thickness depends upon mass transfer rates and can range from about 0.127 millimeters (mm) to about 0.635 mm, with a thickness of about 0.293 mm to about 0.305 mm preferred. Although thicker sheets provide additional support, they possess lower mass transfer rates and therefore decrease water transport rates and electrolyzer efficiency.

The remaining components and the arrangement of the electrolysis cell can be conventional, including the cathode 7, the anode 9, the cathode chamber 1, the anode chamber 3, and the ion exchange membrane. Typically, the electrolysis cell is arranged as follows: cathode chamber 1, cathode 7, ion exchange membrane 5, anode 9, and anode chamber 3, with an external power supply 14 connecting the cathode 7 and the anode 9. Due to the high pressure of the oxygen being produced, the electrolyzer components should be high pressure compatible. High pressure compatibility can be obtained conventionally. Some possible means include: external balancing pressurized fluid, retained within a dome, covering the electrolysis cell, high strength cathode and anode chamber frames, and others, with high strength cathode and anode chamber frames preferred.

Some conventional cathodes and anodes include conventional electrolysis catalysts comprised of supported or unsupported catalysts of noble metals and noble metal alloys, including iridium, palladium, platinum, rhodium, and ruthenium, alloys thereof, and others.

Conventional cathode and anode chambers often comprise metal screens 1a and 3a. The metal screens allow hydrogen, oxygen, and water flow to and from the cathode 7 and the anode 9 and provide support for the ion exchange membrane 5 for pressure differentials of up to about 200 psi (without the porous sheet). Conventional metal screens which are useful in high pressure oxygen production include screens having a thickness and a mesh size determined on the basis of mass flow rates, pressure, and temperature conditions. Typically, these metal screens have a mesh size of about 2/0 to about 6/0, with about 3/0 to about 5/0 preferred. The metal screen thickness generally ranges from about 0.05 mm to about 0.5 mm, with about 0.05 mm to about 0.3 mm preferred. Possible metal screens include titanium, zirconium, tantalum, and niobium expanded metal screens, such as those produced by X-MET Corporation, Bridgeport, Conn., among others.

These metal screens 1a and 3a, in combination with the porous sheet 12, provide support to the ion exchange membrane. Factors effecting the preferred ion exchange membrane include: current density, desired membrane life and efficiency, and operating temperature and pressure, among others. Conventional ion exchange membranes useful for high pressure electrolysis include perfluorocarbon sulfonic acid type membranes due to their electrochemical stability. One such perfluorocarbon sulfonic acid membrane is Nafion ® produced by E. I. dupont de Nemours & Co. (Inc.), Wilmington, Del. Similar perfluorocarbon sulfonic acid membranes are produced by Dow Chemical and others.

Production of high pressure oxygen utilizing the above described electrolysis cell comprises introducing ambient or low pressure water (typically below about 40 psi) to cathode chamber 1. As water enters the cathode chamber 1, it passes through the metal screens 1a and porous sheet 12, and contacts the cathode 7. Due to the hygroscopic nature of the ion exchange membrane and the drying gradient created by water consumption at the anode 9, the water is osmotically transported from the cathode 7, across the ion exchange membrane 5, to the anode 9. Sufficient electricity is applied to the electrolysis cell to electrolyze the water at the anode 9. Typically, voltages between about 1.5 volts to about 3.0 volts can be applied to the electrolysis cell, with voltages of about 1.7 volts to about 2.0 volts preferred.

The electrolysis converts the water to hydrogen ions and oxygen. The hydrogen ions flow back across the ion exchange membrane 5 to the cathode 7 to form molecular hydrogen which passes through the porous sheet 12 and exits the electrolyzer 10 through the metal screens 1a. Meanwhile, the oxygen is retained within the anode chamber 3 by the means for regulating pressure. Once the oxygen has attained the desired pressure level, oxygen exits the anode chamber 3 at a rate commensurate with the production of additional oxygen at anode 9.

As the pressure of the oxygen increases within the anode chamber 3, the pressure gradient across the ion exchange membrane 5 increases. However, the pressure gradient increase does not significantly inhibit the osmotic flow of water from the cathode 7 to the anode 9 since the drying gradient overcomes the pressure gradient. Therefore, water is osmotically transported across the ion exchange membrane 5 against a pressure gradient, and high pressure oxygen production is possible without the use of compressors, other pressure control devices, or a high pressure water stream. The electrolyzer of the present invention is simple, merely requiring a porous sheet to support the ion exchange membrane and a means for regulating pressure. As a result, the system is simplified and the overall system cost is reduced.

Although this invention has been shown and described with respect to detailed embodiments thereof, it would be understood by those skilled in the art that various changes in form and detail thereof may be made without departing from the spirit and scope of the claimed invention.

We claim:

1. A method for producing high pressure oxygen using an electrolysis cell having an anode, a cathode, a hygroscopic ion exchange membrane disposed therebetween, an anode chamber and a cathode chamber, consisting essentially of the steps of:
   a. introducing ambient or low pressure water to said cathode chamber, said cathode chamber having a porous sheet which has multiple pore sizes ranging from about 5 to about 20 microns and a thickness of from about 0.127 to about 0.635 millimeters and which contacts said cathode, allows for a simultaneous, dual-directional flow of hydrogen and water therethrough and which imparts structural integrity to said ion exchange membrane for pressures up to about 6,000 psi;
   b. wicking said water contained in said cathode chamber through said porous sheet to said cathode;
   c. osmotically transporting said water across said ion exchange membrane from said cathode to said anode;
   d. electrolyzing said transported water to hydrogen ions and oxygen wherein voltages between about 1.5 volts to about 3.0 volts are applied to said electrolysis cell; and
   e. retaining said oxygen within said anode chamber until said oxygen reaches a desired pressure level of from greater than 200 psi to about 6,000 psi, wherein as additional oxygen is produced, said retained oxygen pressure increase; whereby said water is osmotically transported across said ion exchange membrane against a pressure gradient formed by said increasing oxygen pressure; and wherein said cathode and said anode are conventional electrolysis catalysts consisting of supported and unsupported catalysts of noble metals and noble metal alloys selected from the group consisting of iridium, palladium, platinum, rhodium, ruthenium and alloys thereof.

2. A method for producing high pressure oxygen as in claim 1 wherein said porous sheet is carbon, niobium, tantalum, titanium, zirconium, and mixtures thereof.

3. A method for producing high pressure oxygen as in claim 1 wherein said porous sheet has a thickness of from about 0.293 millimeters to about 0.305 millimeters.

4. A high pressure oxygen system, said system having an anode, a cathode, and a hygroscopic ion exchange membrane disposed therebetween, an anode chamber, and a cathode chamber comprising:
   a. a porous sheet which has multiple pore sizes ranging from about 5 to about 20 microns and a thickness of from about 0.127 to about 0.635 millimeters for allowing simultaneous, dual-directional flow of hydrogen and water therethrough and for providing structural integrity to said ion exchange membrane for pressures up to about 6,000 psi, said porous sheet located adjacent to said cathode;
   b. a means for introducing ambient or low pressure water to said cathode chamber; and
   c. a means for regulating pressure in said anode chamber, wherein said means for regulating pressure retains oxygen in said anode chamber until said oxygen attains a desired pressure level of from greater than 200 psi to about 6,000 psi, wherein said cathode and said anode are conventional electrolysis catalysts consisting of supported and unsupported catalysts of noble metals and noble metal alloys selected from the group consisting of iridium, palladium, platinum, rhodium, ruthenium and alloys thereof.

5. A high pressure oxygen system as in claim 4 wherein said porous sheet is carbon, niobium, tantalum, titanium, zirconium, and mixtures thereof.

6. A high pressure oxygen system as in claim 4 wherein said means for regulating pressure is a check valve or a back pressure regulator.

7. A high pressure oxygen system as in claim 4 wherein said porous sheet has a thickness of from about 0.293 millimeters to about 0.305 millimeters.

* * * * *